United States Patent [19]

Gatewood

[11] Patent Number: 4,485,909
[45] Date of Patent: Dec. 4, 1984

[54] MULTIPLE STAGE VIBRATION DAMPER

[75] Inventor: Sidney U. Gatewood, Roseville, Mich.

[73] Assignee: Borg-Warner Corporation, Chicago, Ill.

[21] Appl. No.: 388,342

[22] Filed: Jun. 14, 1982

[51] Int. Cl.³ .......................... F16D 3/66; F16D 3/14
[52] U.S. Cl. .............................. 192/106.2; 192/70.17; 464/64; 464/68
[58] Field of Search .................. 192/106.2, 70.17; 464/68, 66, 64

[56] References Cited

U.S. PATENT DOCUMENTS

| 3,266,271 | 8/1966 | Stromberg | 64/27 |
|---|---|---|---|
| 3,327,820 | 6/1967 | Maurice | 192/106.2 |
| 3,556,273 | 1/1971 | Maucher | 192/106.2 |
| 3,802,541 | 4/1974 | Schneider | 192/106.1 |
| 3,817,362 | 6/1974 | Rist | 192/106.1 |
| 3,938,635 | 2/1976 | Davies et al. | 192/106.2 |
| 3,948,373 | 4/1976 | Wörner | 192/106.2 |
| 4,122,931 | 10/1978 | Maucher | 192/106.2 |
| 4,144,959 | 3/1979 | Maucher et al. | 192/106.2 |
| 4,177,888 | 12/1979 | Arrowsmith | 192/106.2 |
| 4,239,097 | 12/1980 | Graecen et al. | 192/106.2 |
| 4,269,296 | 5/1981 | Flotow et al. | 192/106.2 |
| 4,376,477 | 3/1983 | Loizenc | 192/106.2 |
| 4,401,201 | 8/1983 | Gatewood | 192/106.2 |
| 4,410,075 | 10/1983 | Caray et al. | 192/106.2 |

FOREIGN PATENT DOCUMENTS

| 2518258 | 11/1975 | Fed. Rep. of Germany | 192/106.2 |
|---|---|---|---|
| 1196811 | 7/1970 | United Kingdom | 192/106.2 |
| 1398365 | 6/1975 | United Kingdom | 192/106.2 |

Primary Examiner—Rodney H. Bonck
Assistant Examiner—David D. House
Attorney, Agent, or Firm—James A. Geppert

[57] ABSTRACT

A torsional vibration damper assembly providing a variable torsional spring rate in conjunction with variable damping friction torque, which includes a hub having a radial flange, a pair of intermediate drive plates carrying the friction facings and encompassing the hub flange, an outer pair of spring retainer plates axially disposed adjacent the drive plates, and damper springs received in axially aligned spring windows formed in the retainer plates, drive plates and hub flange. Rates and travel of the damper assembly to provide a multi-stage operation are accomplished by modifying the locations or sizes of the damper springs, shape of the spring windows in the various plates, stop pins and/or stop pin slots.

9 Claims, 5 Drawing Figures

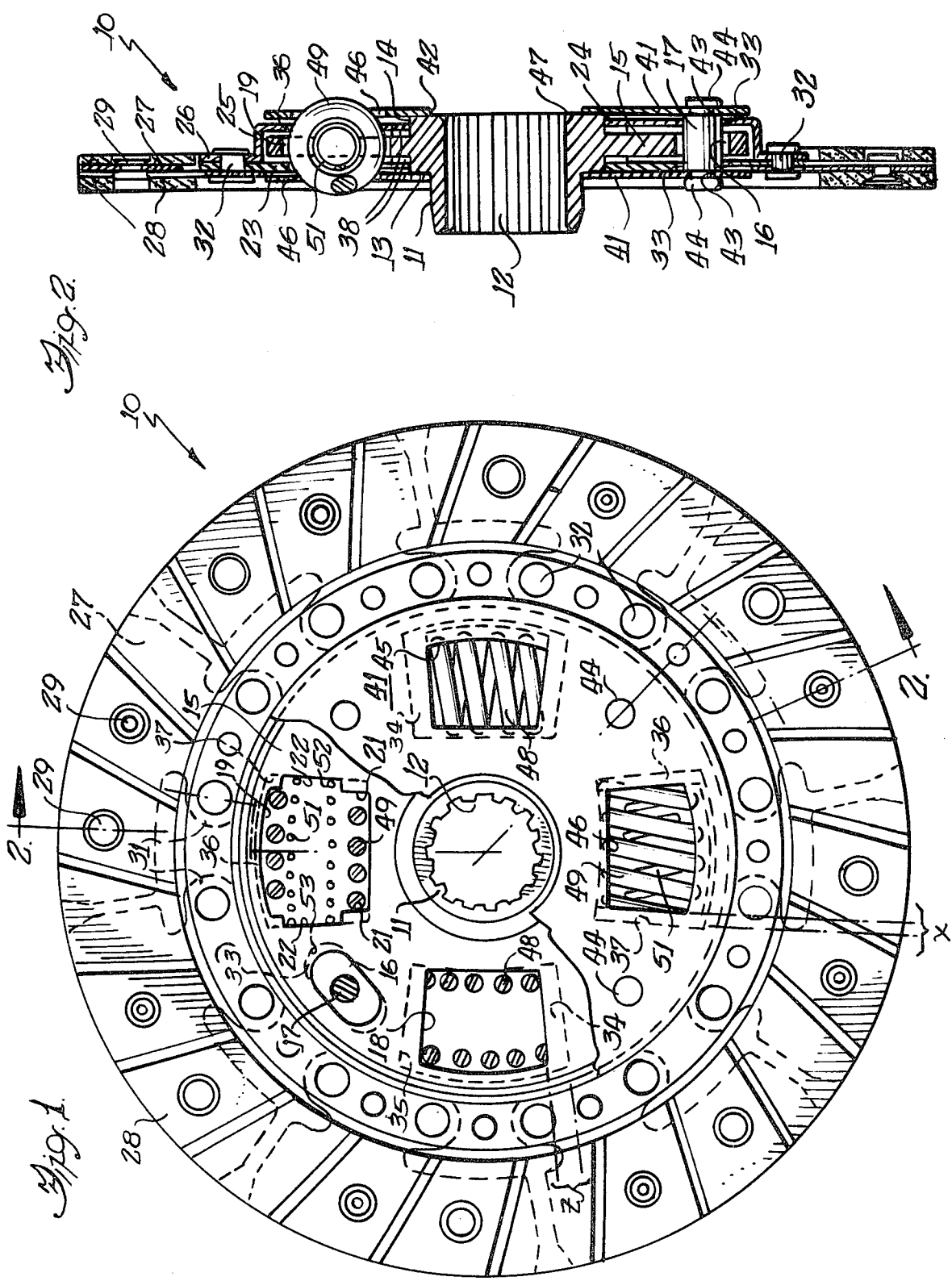

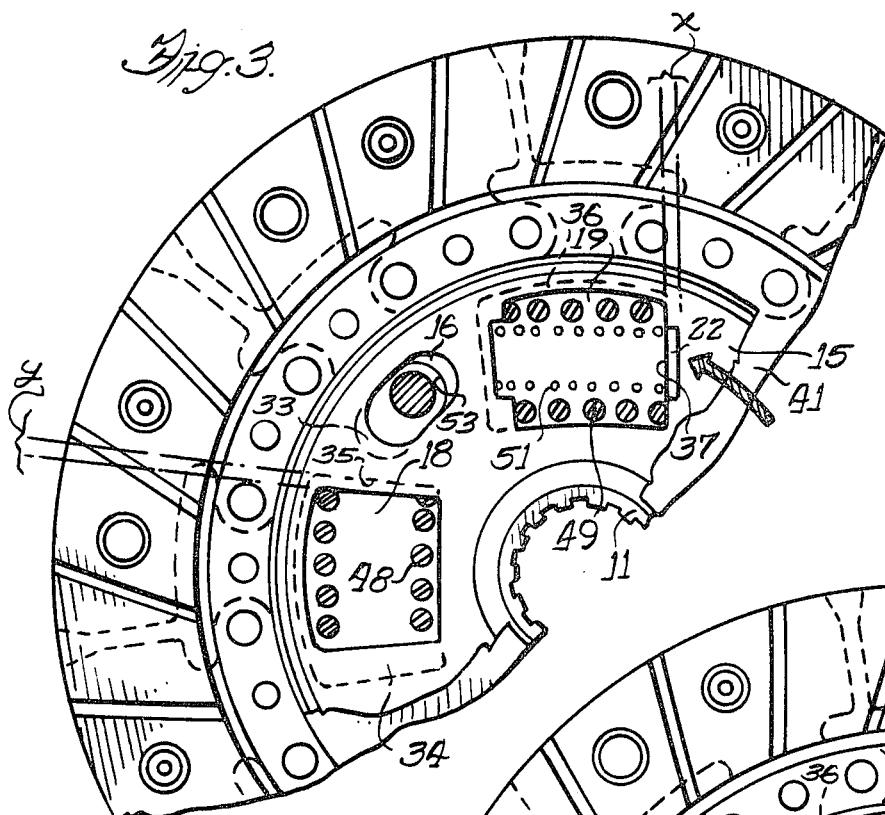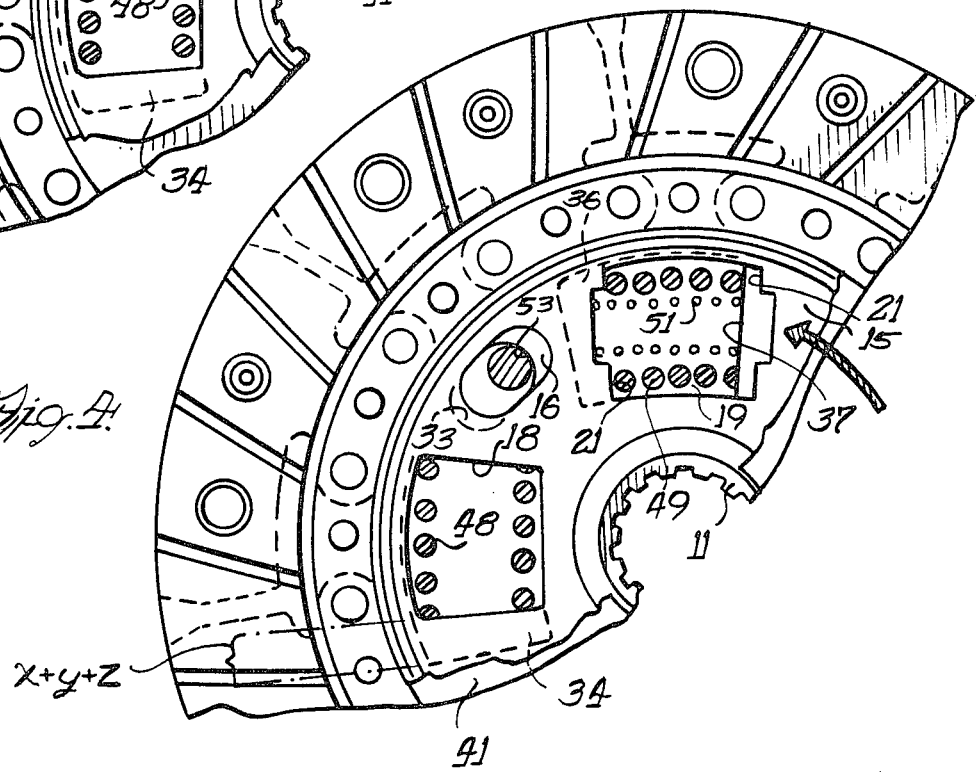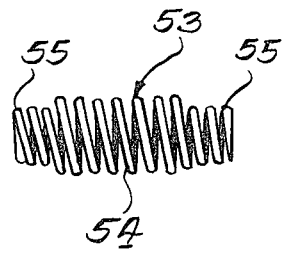

MULTIPLE STAGE VIBRATION DAMPER

BACKGROUND OF THE INVENTION

Vehicle clutch driven plate assemblies often utilize vibration damping means in the friction clutch structure for a manually actuated transmission to overcome objectionable vibration and rattle. Such vibration and rattle generally occur during the torsional engagement of the clutch and flywheel to provide rotation in the drive line between the engine for the vehicle and the transmission input shaft. A conventional clutch assembly incorporating a vibration damper comprises a hub having a barrel operatively connected to the transmission input shaft and an integral radial flange, a clutch plate carrying the friction facings and a spring retainer plate secured together in spaced relation on the opposite sides of the hub flange, and damper springs received in axially aligned sets of spring windows formed in the clutch plate, hub flange and spring retainer plate. Stop pins connect the clutch plate and spring retainer plate together and are received in elongated notches in the flange periphery to allow limited lost motion between the plates and the flange.

The above described damper assembly will provide a substantially constant rate of energy dissipation, and friction washers may be located between the plates and the flange to provide friction damping in addition to the resilient damping. However, specialized problems occur in a vehicle drive line, such as gear rattle during idle, which will not be solved by a conventional damper. Such specialized conditions will necessitate some form of a multi-stage damper to overcome the problems inherent therein. The present invention relates to a multiple stage damper which will overcome specialized drive line problems.

SUMMARY OF THE INVENTION

The present invention comprehends the provision of a novel multiple stage damper assembly in a vehicle friction clutch having special characteristics which will eliminate or isolate objectionable vibrations, noise and/or gear rattle in the transmission which may otherwise occur at neutral or under engine full load. This assembly has a three-stage torsional spring rate, including a first stage having an extremely low torsional spring rate in conjunction with zero or low damping friction torque, a second stage having an increased torsional spring rate with zero or low damping friction torque, and a third stage with a further increased torsional spring rate in conjunction with normal or high damping friction torque. The second stage acts to provide a smooth transition between the first and third stages.

The present invention also comprehends the provision of a novel multiple stage damper assembly utilizing a pair of drive plates carrying the friction facings and sandwiching the hub flange, and a pair of spring retainer plates secured in spaced position outside of the drive plates. The use of inner and outer concentric damper springs and variations in the spring window dimensions in the various plates and hub flange provide the multi-stage travel. The spring retainer plates are in frictional contact with the hub while the drive plates are spaced from the hub to provide variations in the damping friction torque.

Further objects are to provide a construction of maximum simplicity, efficiency, economy and ease of assembly, and such further objects, advantages and capabilities as will later more fully appear and are inherently possessed thereby.

DESCRIPTION OF THE DRAWINGS

FIG. 1 is a rear elevational view with portions broken away of a friction clutch plate embodying the vibration damper of the present invention.

FIG. 2 is a cross sectional view taken on the irregular line 2—2 of FIG. 1.

FIG. 3 is a partial rear elevational view of the clutch assembly at the end of the first stage of travel.

FIG. 4 is a view similar to FIG. 3 but at the end of the second stage of travel.

FIG. 5 is a side elevational view of an alternate spring shape used in the damper of FIGS. 1 through 4.

DESCRIPTION OF THE PREFERRED EMBODIMENT

Referring more particularly to the disclosure in the drawings wherein is shown an illustrative embodiment of the present invention, FIGS. 1 through 4 disclose a clutch driven plate assembly 10 having a multiple stage damper incorporated therein. The assembly includes a hub having a barrel 11 with a central splined passage 12 to receive the splined end of a transmission input shaft (not shown) and an integral radial flange 15. The barrel includes a first shoulder 13 thereon and a second shoulder 14 of a reduced width radially outwardly of the first shoulder 13. The flange has a thickness slightly less than the width of shoulder 14 and is provided with four equally spaced elongated arcuate slots 16 receiving stop pins 17, a pair of oppositely disposed spring windows 18,18 and a pair of oppositely disposed spring windows 19,19 having extensions 22,22 at the opposite ends 21,21.

A pair of drive plates 23,24 are journalled on the shoulder 14 to sandwich the hub flange 15 therebetween. The flat plate 24 has a peripheral offset 25 terminating in a radial flange 26 abutting the periphery of flat plate 23. Cushion springs 27 carrying the friction facings 28 secured thereto by rivets 29 have their inner mounting tabs 31 abutting the plate 23, and rivets 32 extend through aligned openings in the plate flange 26, plate 23 and tabs 31 to secure the plates and friction facings together as a unit. As seen in FIG. 1, the drive plates 23,24 have axially aligned elongated arcuate slots 33,33 receiving the stop pins 17; the slots 33 being aligned with but of a greater length than the slots 16 in the hub flange. Also, the drive plates each have a pair of oppositely disposed spring windows 34,34 axially aligned with but larger than the flange windows 18, and a pair of oppositely disposed spring windows 36,36 axially aligned with the flange windows 19. The ends 37 of each window 36 coincide with the ends of the extensions 22, but the windows 36 are wider than the windows 19. A pair of annular spacers 38 are located between the inner peripheries of the plates 23,24 and the flange 15.

Positioned outside of the drive plates 23,24 are a pair of spring retainer plates 41,41, each having a central opening 42, four openings 43 to receive an end 44 of each of the stop pins 17, a pair of spring windows 45 axially aligned with and of approximately the same length as the flange windows 18 but of a slightly smaller width than the flange windows, and a pair of spring windows 46 axially aligned with and of approximately the same length but a lesser width than the flange windows 19. The stop pins 17 are of such a length as to result in the retainer plates being in frictional contact with opposite surfaces of the hub barrel defined by the shoulder 13 and the rear end 47 of the barrel.

Compression springs 48 are received in each of the two aligned sets of windows 18,34 and 45, while a pair of generally concentric springs 49 and 51 are received in each of the two aligned sets of windows 19,36 and 46; the smaller diameter spring 51 having its ends 52,52 received in the extensions 22 of flange windows 19. In the neutral position shown in FIG. 1, the ends 35 of spring windows 34,34 in plates 23,24 are centrally positioned around each hub spring window 18 with a space "z" on each end of spring 48.

When torque is applied through engagement of the friction facings 28 with the flywheel and pressure plate (not shown) rotated by the vehicle engine, the inner drive plates 23,24 are rotated to compress the inner springs 51 through a distance "x" by the trailing ends 37 of spring windows 36 (see FIG. 3). During this rotation, there is substantially no sliding friction between plates 23,24 and the hub flange 15 and the ends 35 of the windows 34 do not contact the springs 48, but the clearance has been reduced to the distance "y". This movement of the inner drive plates produces an extremely low torsional spring rate with zero or low damping friction torque to provide a first stage of travel with the outer plates 41 remaining stationary. At completion of this first stage, the trailing end surfaces 37 of inner plate windows 36 are in line with the ends 21 of windows 19 and the ends of springs 49.

During the second stage of travel, the inner plates 23,24 drive and compress both the inner springs 51 and the outer springs 49 for the distance "y" wherein the trailing ends 35 of inner plate windows 34 are in line with the ends of springs 48 (FIG. 4). The outer plates 41 remain stationary so there is zero or low damping friction torque. Also, at the end of the second stage of travel, the ends 53 of the elongated slots 33 are now in line-to-line contact with the stop pins 17. Upon completion of the second stage of travel, the spacing between the leading end of each spring 48 and each spring window 34 is a combined distance of "x+y+z" (FIG. 4).

In the third stage of travel, the inner springs 51 and outer springs 49 continue to be compressed and movement of outer plates 41 initiates compression of the springs 48; therefore, all springs 48,49 and 51 are in compressive operation during the remainder of the travel until the stop pins 17 contact the hub slots 16. The surfaces of the hub slots and the slots 33 in the inner plates 23,24 clamp the stop pin body diameter in a scissors-type action. Also, in the third stage of travel, the sliding movement of the outer plates in frictional contact with the hub shoulder 13 of the hub barrel 11 provides a substantial damping friction for the third stage of travel. The hub barrel has the first shoulder 13 of a width slightly greater than the shouldered portion of the stop pins 17 to provide an interference fit between the outer plates 41 and hub barrel 11, while the second shoulder 14 has a width slightly less than the mating surfaces of the inner plates. Furthermore, the hub flange 15 beyond the outer diameter of the secondary shoulder is substantially reduced in thickness from the width of the secondary shoulder to assure no frictional contact with the surfaces of the inner plates.

The inner plates 23,24 are centrally located about the compression spring and hub flange center lines and provide a rigid drive system which applies a constant and uniform pressure to the spring ends to prevent side buckling when under load, which could cause side thrust of the springs against the outer plates and result in undesirable friction and excessive side plate and spring wear. The inner plate unit maintains axial position relative to the hub flange and outer plates while serving the multiple purpose of driving the inner springs 51 during the first stage of travel and providing for substantially friction-free first and second travel stages as well as driving all springs at some time.

Although a conventional inner spring 51 is shown in FIGS. 1 through 4, it may be advantageous to utilize a barrel-type spring (semi-conical) to avoid an interference condition between the inner spring and the internal diameter of the outer spring 49 during the required rotational travel when the end of the inner spring is rotated to a flush or in-line condition with the end of the outer spring. FIG. 5 discloses an alternate inner spring 53 with the center portion 54 having an outer diameter slightly smaller than the internal diameter of the outer spring, and the ends 55 are reduced for several coils to provide proper contact with the inner plates and clearance with the outer spring internal diameter under operating conditions.

Furthermore, the spring windows 19 are shown as having extensions 22 to receive the ends 52 of the inner springs 51; however, the areas in the corners of the windows 19 could be removed to provide an enlarged generally rectangular window. This alteration in the window shape will result in various damper configurations which will still maintain the previously described low spring rate in conjunction with zero or low damping friction torque for the first stage of travel.

I claim:

1. A torsional vibration damper assembly utilized in a clutch friction plate construction for a vehicle, comprising a hub having a barrel and an integral radial flange, a pair of inner drive plates journalled on the hub on opposite sides of the hub flange, said plates being secured together in spaced relation and carrying friction facings, a pair of outer spring retainer plates journalled on said hub and secured in spaced relation outside said inner plates by a plurality of stop pins, said outer plates frictionally engaging said hub while said inner plates are spaced from frictional contact with said hub, said inner plates and hub flange having axially aligned arcuate elongated slots receiving said stop pins, said inner and outer plates and said hub flange having a first pair and a second pair of oppositely disposed axially aligned spring windows, said pairs of windows being removed by 90°, damper springs located in each set of spring windows, and lost motion means included in each pair of spring window sets providing a three-stage damper operation.

2. A torsional vibration damper assembly as set forth in claim 1, including a first shoulder formed on said hub barrel of a width slightly greater than the spacing between the shoulders of each stop pin so that said outer plates frictionally engage said shoulder, and a second shoulder radially outwardly of the first shoulder and of a width less than the spacing between said inner plates.

3. A torsional vibration damper assembly as set forth in claim 2, in which said lost motion means for said first pair of spring window sets comprises a pair of spring windows in each outer plate and said hub flange having substantially the same length, and the aligned spring windows in the inner plates have a substantially longer length.

4. A torsional vibration damper assembly as set forth in claim 2, in which said lost motion means for said second pair of spring window sets comprises a pair of spring windows in the outer plates and hub flange having approximately the same length, said second pair of spring windows in the hub flange having reduced width extensions at each end, and the pair of spring windows in the inner plates having approximately the same length as the spring window extensions in the hub flange.

5. A torsional vibration damper assembly as set forth in claim 4, in which said damper springs include a pair of concentric springs located in each aligned set of second spring windows, the inner spring being of greater length than the outer spring and projecting into the extensions in the hub flange windows.

6. A torsional vibration damper assembly utilized in a clutch friction plate construction for a vehicle, comprising a hub having a barrel and an integral radial flange, a pair of inner drive plates journalled on the hub on opposite sides of the hub flange, said plates being secured together in spaced relation and carrying friction facings, a pair of outer spring retainer plates journalled on said hub and secured in spaced relation outside said inner plates by a plurality of stop pins, said inner plates and hub flange having axially aligned arcuate elongated slots receiving said stop pins, said inner and outer plates and said hub flange having a first pair and a second pair of oppositely disposed axially aligned spring windows, said pairs of windows being removed by 90°, damper springs located in each set of spring windows, and lost motion means included in each pair of spring window sets providing a three-stage damper operation, said lost motion means for said first pair of aligned spring window sets comprising pairs of spring windows in the outer plates and hub flange of approximately the same length and the pairs of spring windows in said inner plates having a longer length, the damper springs for the above mentioned spring windows being conformably received in the aligned spring windows in the outer plates and hub flange, said lost motion means for said second pair of spring window sets comprising pairs of spring windows in the outer plates and hub flange having approximately the same length, said second pair of spring windows in the hub flange having reduced width extensions at each end, and the pairs of spring windows in the inner plates having approximately the same length as the spring window extensions in the hub flange, said damper springs including a pair of concentric springs located in each aligned set of second spring windows, the inner spring being of greater length than the outer spring and projecting into the extensions in the hub flange windows.

7. A torsional vibration damper assembly as set forth in claim 6 in which said hub flange has a first shoulder of a width slightly greater than the length of the stop pins between the outer plates, and a second shoulder radially outwardly of said first shoulder and of a width less than the spacing between said inner plates.

8. A torsional vibration damper assembly as set forth in claim 7, in which said outer plates are in frictional contact with said first shoulder of the hub, and said inner plates do not frictionally engage said hub.

9. A torsional vibration damper assembly as set forth in claim 8, in which said three stage damper operation when torque is applied to said friction facings to cause rotation of said inner plates includes compression of said longer inner springs by the inner plates to provide a low spring rate and zero friction torque damping first stage until said inner plates engage the outer springs in said second pair of spring windows, compression of both the inner and outer concentric springs to provide an increased spring rate and zero friction torque damping second stage until the arcuate slots in the inner plates engage the stop pins and the larger windows of the first pair of spring windows in the inner plates engage the damping springs therein, and compression of all damper springs in parallel with rotation of the outer plates to provide a higher spring rate and greater friction torque damping third stage.

* * * * *